United States Patent [19]

Thompson et al.

[11] Patent Number: 4,799,890

[45] Date of Patent: Jan. 24, 1989

[54] ELECTRONIC LEARNING DEVICE FOR TEACHING HOW TO TELL TIME

[75] Inventors: Barbara J. Thompson, 3032 Early Morning La., Knoxville, Tenn. 37922; Ashok Dittakavi, Gwinnett County, Ga.

[73] Assignee: Barbara J. Thompson, Knoxville, Tenn.

[21] Appl. No.: 123,729

[22] Filed: Nov. 23, 1987

[51] Int. Cl.[4] .............................................. G09B 19/12
[52] U.S. Cl. ...................................... 434/304; 368/63
[58] Field of Search ........................... 434/304; 368/63

[56] References Cited

U.S. PATENT DOCUMENTS 3,835,640  9/1974  Hughes, Jr. ......................... 434/304
4,015,346  4/1977  Ogasawara ......................... 434/304

Primary Examiner—Leo P. Picard
Attorney, Agent, or Firm—Pitts and Brittian

[57] ABSTRACT

An electronic learning device (10) for teaching how to tell time is provided. A student provides input to the device, in a preferred embodiment, by a plurality of keys (14) which select the learning activity and its difficulty level. In certain activities, the device (10) request (visually and/or auditorily) the student to engage in a randomly selected time-identification problem. The student's response is compared with the correct response, and the information concerning the appropriateness of the response is provided to the student. In the case of erroneous response, the correct response can be presented to the student both orally and visually. A speech synthesizer (38) (and/or analog and/or digital display) serves to generate a request to the student concerning time identification problems, and comments on the appropriateness of the student's response. In the preferred embodiment, the device is provided with a plurality of operational modes ranging from merely generating an audio signal identifying the correct time to engaging in interactive activities and games related to time identification problems.

12 Claims, 5 Drawing Sheets

ND LEARNING DEVICE FOR
TEACHING HOW TO TELL TIME

DESCRIPTION

1. Technical Field

This invention relates to an electronic learning device, and more particularly concerns a speech device for teaching how to tell time.

2. Background Art

Electronic educational learning aid products have heretofore been known. These products are designed to deal with specific educational problems such as spelling, math, reading, or the like. Certain of these products have the capability of communicating with the student through synthesized speech. Known prior art generally relating to the field of speaking electronic educational products is described in the following U.S. Pat. Nos.: 4,505,682; 4,403,965; 4,457,719; and 4,327,375.

To date, no known dedicated electronic learning devices are directed towards the specific problem associated with teaching students how to tell time by analog and digital clocks. As will be recognized, analog clocks present a special problem in the tutorial field due to the fact that the learning aids must recognize the position of the hands of the clock which are preferably student operable.

Accordingly, it is an object of the present invention to provide an electronic learning device for teaching students to tell time by analog and/or digital clocks.

It is also an object of the present invention to provide such an electronic learning device which includes an analog clock having student operable hands which can be readily manipulated to provide input to the device.

It is also an object of the present invention to provide such an analog clock that is manipulated by the electronic learning device to display the correct time of day or the correct response to a question or learning exercise.

It is a further object of the invention to provide a clock which speaks the correct time in response to prompting.

In order to maintain the interest of the student, the time learning device of the present invention is provided with a plurality of operational modes which range, from merely serving as an audible clock, to providing students with game like exercises to increase the enjoyment of the learning experience. These exercises can be selected by the student and/or randomly selected by the device. Accordingly, another object is to provide the student with a variety of stimulating educational experiences serving to enhance his/her ability to tell time with analog and digital clocks.

DISCLOSURE OF THE INVENTION

Other objects and advantages will be accomplished by the present invention which provides an electronic learning device to develop and/or enhance a student's ability to tell time by digital and/or analog clocks. The electronic device of the present invention includes, in a preferred embodiment, a keyboard upon which a student can select an activity and its level of difficulty. An analog clock input has student operable hands which are preferably connected to an encoder which generates a code representative of the time identified by the position of the hands. The student is requested in one mode of operation to engage in specific time-identification problems which are randomly selected. The student's response to each such request generates a specific code which is compared to the correct response stored in memory or computed by the electronic learning device. A speech synthesizer serves to effect the request and comment on the appropriateness of the responses by the student. In one embodiment, a DC motor is used to drive the analog clock hands to display the time of day and/or the correct response to a question in a learning exercise posed by the electronic learning device. In the preferred embodiment, various modes of operation of the device are provided. These modes range from merely a speaking clock to a game capable of being played by one or two players based on time-identification problems.

BRIEF DESCRIPTION OF THE DRAWINGS

FIG. 2 provides illustrations of the analog clock which in the depicted embodiment uses a shaft angle encoder.

BEST MODE FOR CARRYING OUT THE INVENTION

Figure 1:
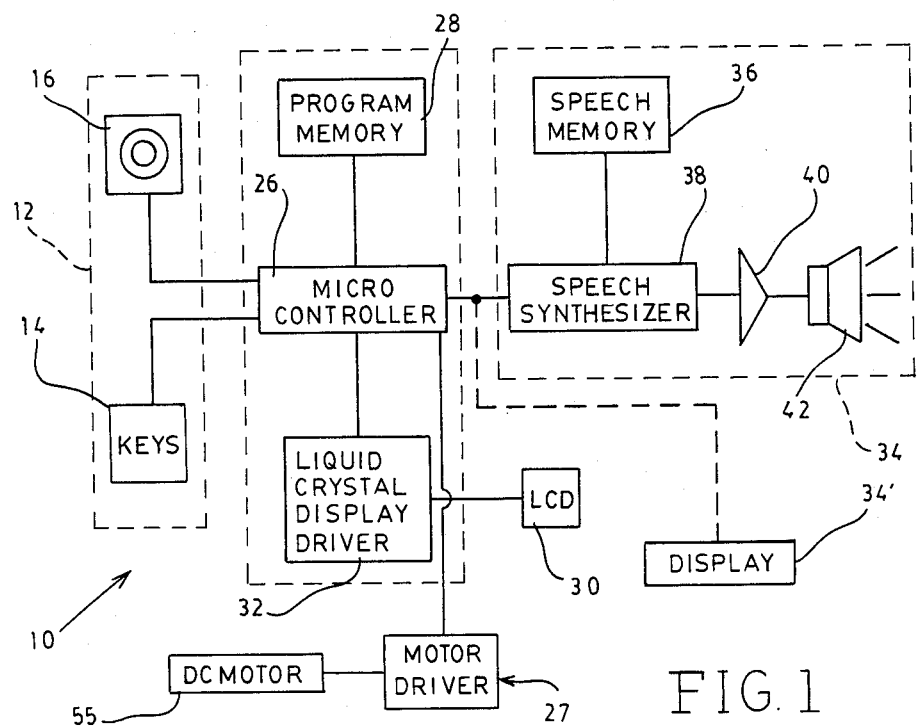
FIG. 1 illustrates a block diagram of an electronic learning device for teaching time constructed in accordance with various features of the present invention.

An electronic learning device constructed in accordance with various features of the present invention is illustrated generally at 10 in the block diagram of FIG. 1. This device is particularly designed to teach students how to tell time, and will be described first in terms of its components and then in connection with its operational modes.

Input into the device 10 is accomplished by input means generally indicated at 12. In the preferred embodiment, the input means 12 includes keys 14 which serve to energize the system, and perform various other input functions as is more clearly delineated below and in FIG. 3.

Moreover, the input means 12 includes an analog clock 16 (or a digital clock) in the preferred embodiment having student operable hands 18 and 20 (see FIG. 2A) which can be moved by knob 45 attached to the minute hand 20. Further, keys 22 are dedicated to setting the digital clock 24 as will be described below. The block diagram of the input means 12 comprising keys 14 (including keys 22 for digital clock 24) and the analog clock 16 in FIG. 1. These inputs are decoded by a controller 26 and acted upon pursuant to rules defined in the product program stored in memory 28 and depicted in the flow charts of FIG. 4. The inputs to the controller 26 are all digital signals having one or two discrete levels in the preferred embodiment.

Visual communication to a student using the device is accomplished by writing to the liquid crystal display 30 shown in FIG. 1. To this end, a liquid crystal display driver 32 is used which is commonly available in the art in the form of an integrated circuit. This conventional liquid crystal display 30 comprises a clock in the preferred embodiment. The functions of the controller 26 for the memory 28 and the liquid crystal driver can be combined into a single chip, 4-bit microcomputer with the LCD Driver, Model LC5850 available from Sanyo Semiconductor Corporation.

Visual communication is also accomplished via the analog clock face by coupling the shaft 54 for the minute hand to the shaft 53 of a DC motor 55 through a set of gears 57A and 57B. The shaft 52 of the hour hand 18 is coupled to the minute hand shaft 54 via appropriate gears 57B through 57E as shown in FIG. 2B. It will be noted in FIG. 1 that motor 55 is connected to the controller 26 through motor driver 27 of conventional design. This motor 55 serves to manipulate the hands of clock 16 in response to signals produced by controller 26.

Audible communications with the student are accomplished by the auditory communication section 34. This auditory communication section responds to requests made by the controller 26. Such requests can be prompted by student input through input means 12 and/or by commands stored in memory 28. Speech memory 36 contains digital data representing digital speech from which synthesized speech is derived. This speech relates to a plurality of time-identification problems, the correct responses thereto and comments upon the appropriateness of such responses made by a student as proposed answers to specific time-identification requests or questions. Moreover, information concerning time to be announced is stored in speech memory 36. A suitable speech memory is provided by Model LC3100, 128K bit CMOS ROM (Read Only Memory) available from Sanyo Semiconductor Corporation. This particular memory provides digital auditory information which is supplied to synthesizer 38 that generates the auditory requests and comments produced by the device in the form of spoken and synthesized words. This Model LC3100 serves as a suitable memory for a single chip speech synthesizing system/processor.

The synthesizer 38 utilizes the digital information to synthesize an analog sound waveform which is in turn provided to conventional amplifier 40. A suitable amplifier 40 consists of Model LA6805 low voltage power amplifier available from Sanyo Semiconductor Corporation. This amplifier provides the analog signal at a suitable level to a conventional speaker 42 for generation of the audible communication produced by the device 10.

Alternatively, a suitable display means 34' can be provided to communicate with the students for affecting requests and commenting on the appropriateness of responses to time-identification problems. This display means 34' is optional and can comprise a standard LCD and driver.

Figure 2A:
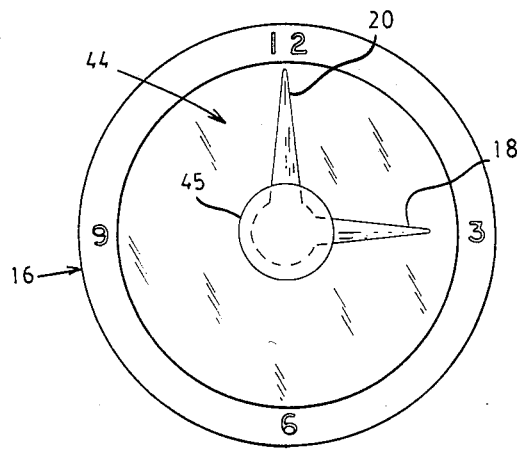
FIG. 2A shows a clock face as seen by the student.
Figure 2B:
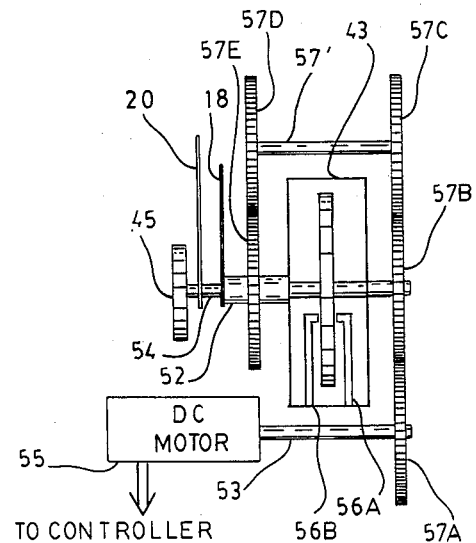
FIG. 2B illustrates a side elevation view of the operable clock hands shown in FIG. 2A that allows control of the clock hands via the use of a DC motor and appropriate gears.

The analog clock generally indicated at 16 in FIG. 2 serves as a portion of the input means 12 for the device 10. In the embodiment depicted in FIG. 2A, a shaft angle encoder with dual concentric shafts 52 an 54 used to input the time by the student as represented on the analog clock face 44. To this end, a control knob 45 is connected to the shaft 54 corresponding to the minute hand 20. The minute hand shaft 54 and the hour hand shaft 52 are coupled via gears 57B through E and the operatively associated shaft shown in FIG. 2B in such a manner as to allow proportionate movement of the hour hand 18. In this connection, a custom version of the P/Rel (Trademark) rotary switch manufactured by Standard Grigsby, Inc., 920 Rothbone Avenue, Aurora, Ill. 60507, serves as a suitable encoder for inputting the time from the clock 16. This encoder 43 is well known in the art and provides a resolution necessary to decode the minute hand of the clock to an accuracy of a minute.

Figure 2C:
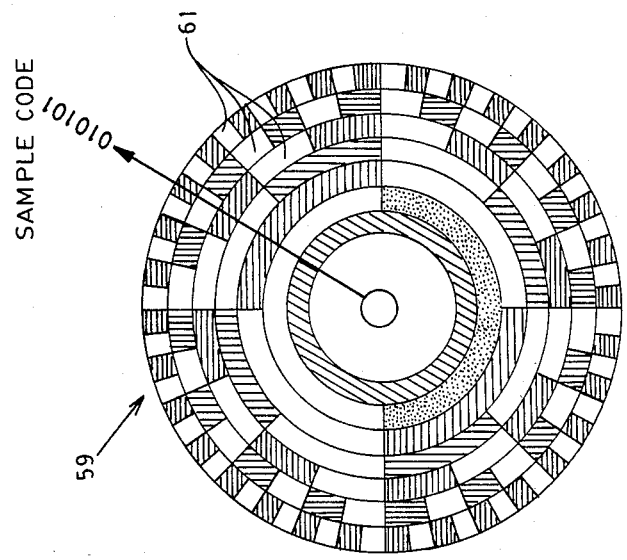
FIG. 2C demonstrates one suitable embodiment of an encoder which generates the required code representative of the clock hands' positions and the corresponding time.

The hour hand 18 and the minute hand 20 are concentrically attached to dual shafts 52 and 54, respectively. The minute hand shaft 52 is in turn connected to a printed circuit disc 59 which is depicted in FIG. 2B and in FIG. 2C. Contact sets 56A and 56B are mounted proximate the middle of the disc or printed wiring board (PWB) 59 substantially perpendicular to the shaft 54. Each of the contacts rubs against specially coded tracks 61 such as are provided on the P/Rel rotary switches described above, and typically illustrated in greater detail in FIG. 2C. It will be noted in FIG. 2C that the contacts wipe against the specially coded tracks 61 on a printed wiring board (PWB) 59, or equivalent, whose plane is perpendicular to the shaft and parallel to the contacts. The tracks on the printed wiring board are arranged in such a manner as to provide a coding to the device based upon the relative position of the contacts 56A or 56B. In the preferred embodiment, the tracks shown on disc 59 are printed on the side sensed by contact 56A with contact 56B serving to stabilize the disc. The tracks on the printed wiring board in FIG. 2C show an example of a binary code. These tracks could also be arranged to provide other forms of coding techniques such as gray code. Thus, the student or operator can input his response by manipulating the knob 45 of the analog clock in either direction, clockwise or counter-clockwise. After setting the hands at the desired position, the student will check his response for appropriateness.

It will be noted that encoder 43 senses the position of the minute hand 20 only in the preferred embodiment. The position of the hour hand can be derived by the controller 26 through the contacts 56A or 56B which sense the rotational position and number of rotations of the disc 59 and produce a code (see sample code in FIG. 2C) representative of the disc position as it rotates on shaft 54 (see FIG. 2B).

It will be noted that this type of ergonomically simple mode of input could be accomplished by means other than a shaft angle encoder. For example, a suitable input would be the use of optical transceivers used in combination with slotted wheels that produce positional information relating to both direction and magnitude of the shaft movement. To those skilled in the art, it will also be recognized that a dot matrix display representative of an analog clock could be substituted for the analog clock 16 in a derivative product. Thus, the clock 16 is intended to encompass such an alternate embodiment.

Figure 3:
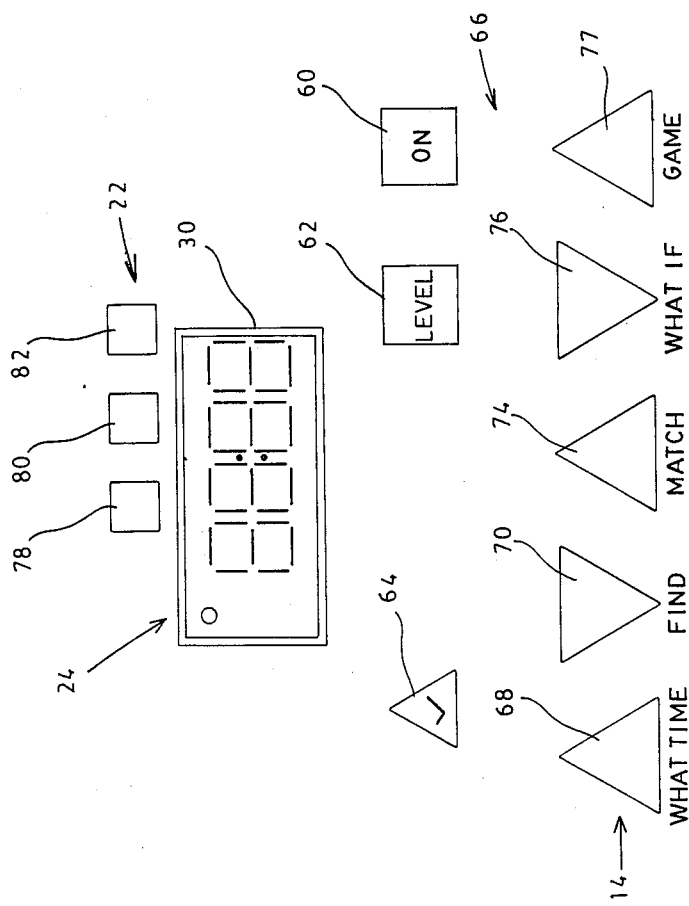
FIG. 3 shows function/feature keys comprising a portion of the student operable input mechanism of the device.

When it is desired to use the device 10, a student will initially activate the input means 12 and more specifically, the ON key 16 (see FIG. 3). Upon pushing this key, the device acknowledges to the student operator that it is ready for additional input by speaking the actual time of day displayed in a digital display 30. In the preferred embodiment, the spoken time is followed by flashing the digital indication of the time on the display 30 twice to provide an audio/visual reinforcement. Key 62 is the LEVEL key and is used by the student or operator to select the level of difficulty of the chosen activity. In this connection, in the preferred embodiment there are four levels of activity ranging from Level 1, which is the least difficult, to Level 4, which is the most difficult. Communication of the level selected is provided by displaying L1 through L4 on the display 30 in combination with the speaking of the selected activity level.

Key 64 is the CHECK key which provides the student operator with an indication, after responding to a device's request or question relating to a particular activity of the appropriateness of the response. By pressing key 64, the device checks for the correctness of the response and comments on its appropriateness with respect to the particular time-identification problem or request made by the device. If the response is correct, the device replies with a praise, and if the response is not correct, a phrase of encouragement is spoken by a message of "Try Again" or the like. After a selected number of attempts, depending on the activity, the system in the preferred embodiment gives the correct response to the student as part of the learning process.

The activity keys are generally indicated at 66 in FIG. 3. These keys are used by a student to select a specific activity or mode of operation of the device. Key 68 is the WHAT TIME key. After the student turns the hands of the analog clock 16, the time on the analog clock is spoken when this key is pressed. The same is true when using the digital clock 24.

Key 70 is the FIND key. The student is requested by the device to set the clock to a certain time. The student then sets the hour and minute hands of the clock and checks his response by pressing CHECK key 64. This activity can also be undertaken in connection with the digital clock.

Key 74 is the MATCH key. The student is requested by the device to match the analog clock to the time shown by the digital clock and vice versa. The student sets the hour and minute hands on the clock and checks his response by pressing the CHECK key 64. In the alternate mode, the student sets the digital display via keys 78 and 80 to match the time shown on the analog clock and checks the response by pressing the CHECK key 64.

Key 76 is the WHAT IF? key. Here, the student is presented with a spoken time-identification problem. The student responds either through the analog or digital clock inputs and checks the response by pressing CHECK key 64.

Key 77 is the GAME key. Here the student is challenged with the time-identification game. The game could be played by one player (against the system) or two players competing against each other. The score can be displayed on the digital display 30 and auditory feedback also provided.

Figure 5:
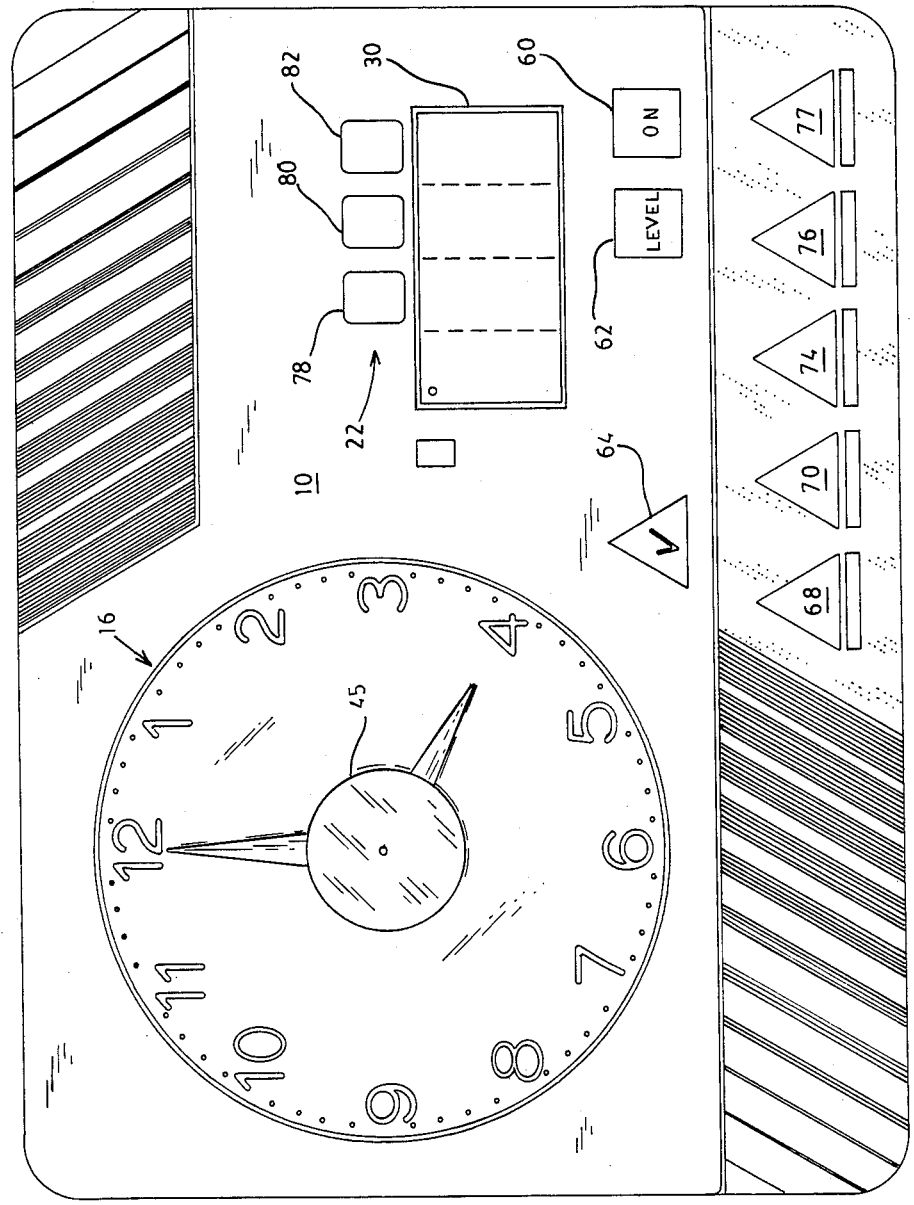
FIG. 5 illustrates a proposed face of the device, and displays the student operable input mechanisms.

Normally, a parent or an adult installs the batteries necessary to power the unit and sets the analog clock first and then the digital clock to the correct time of day. This is accomplished by rotating the knob and through keys 22 shown in FIGS. 3 and 5. Key 78 advances the hours indicated on the display 30, and key 80 advances the minutes indicated on the display. As is common, the numerals on the display 30 advance by one numeral for each push of the key. However, when the key is held down continuously, the numerals will advance rapidly to facilitate a quick response input by the operator. A suitable recessed reset key 82 is preferably accessable with a pencil or other tipped tool and depressed only when it is desired to reset the clock to the correct time.

Figure 4A:
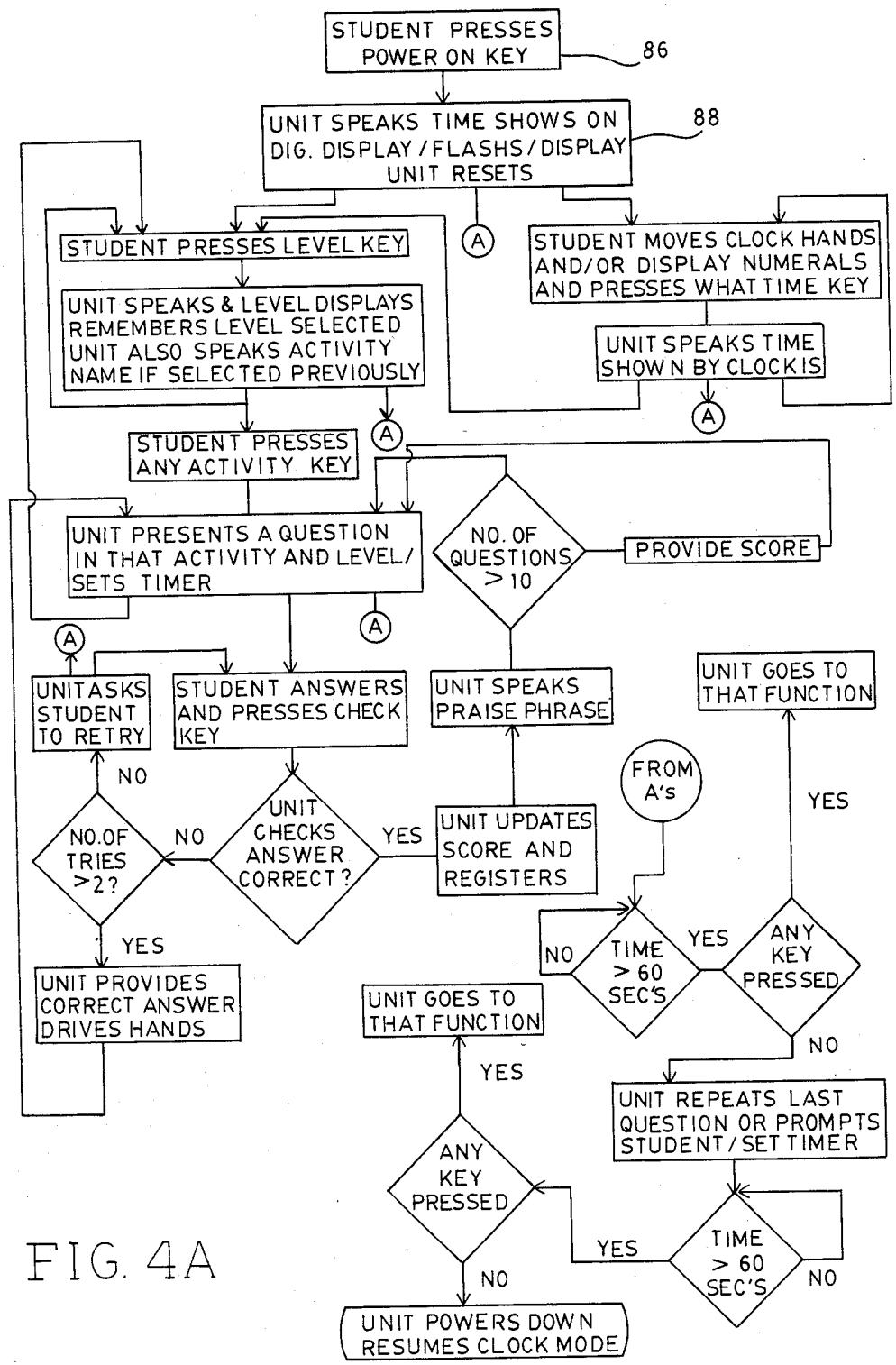
FIG. 4A illustrates a flow chart of operational steps of one embodiment of the device.
Figure 4C:
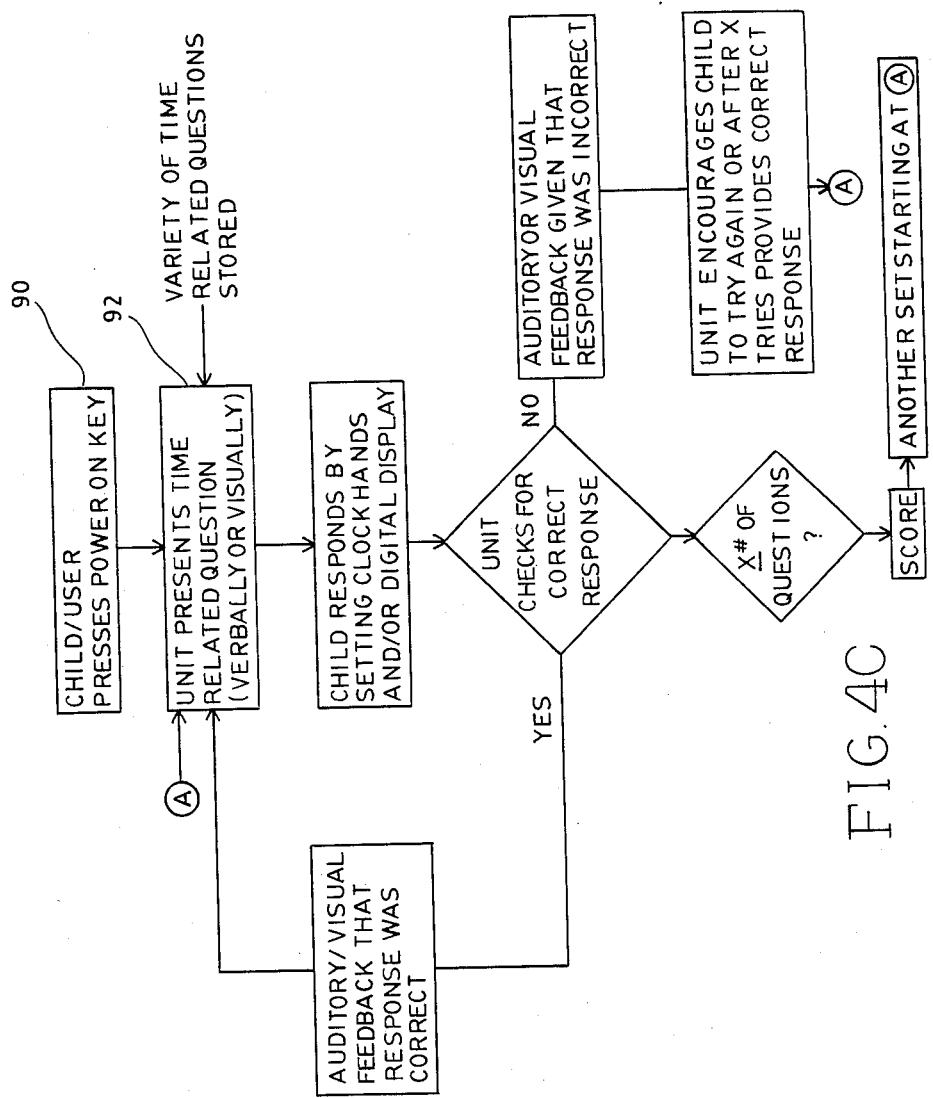
FIG. 4C illustrates a flow chart of operational steps of the device which incorporates preselected activities which can be sequenced and/or randomly selected.
Figure 4B:
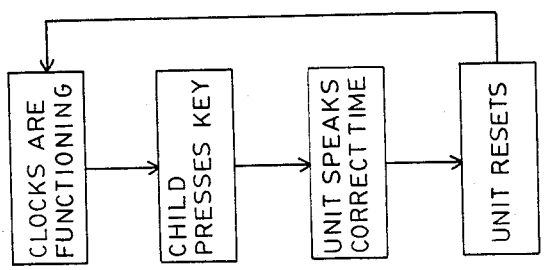
FIG. 4B illustrates a flow chart of operational steps of the device used as a talking or audible clock only.

The flow charts depicted in FIGS. 4A through 4C illustrate the modes of operation of the device 10 in the preferred embodiment.

While the flow charts can be readily read by those skilled in the art, the system operation based on the rules depicted in the charts will be discussed. However, it should be noted that the flow charts depict preferred operational embodiments, and disclose specific timing of events and number of tries greater than specified digits. These specific references are enclosed as examples only, and are not intended to limit the scope of the invention.

Initially, the student depresses the ON key 60 as indicated at 86. The device 10 responds by speaking the time shown on the digital display followed by flashing the numerals on the display two times in the preferred embodiment. Pressing key 60 also resets the unit. At this point the student may make one of several choices:

1. (a) He can move the clock hands randomly or otherwise and press the WHAT TIME? key 68. In this case, the unit speaks the time shown on the analog clock. In a derivative product, this can be the only functioning of the device as will be described in connection with FIG. 4B.

(b) He can change (temporarily) the time shown by the digital clock through use of keys 78 and 80, and press the WHAT TIME? key 68. In this case, the unit speaks the time shown on the digital clock.

(c) He can change (temporarily) both the analog and digital clock settings and press the WHAT TIME? key 68. In this case the unit speaks both the times shown along with a description, for example, "The clock hands show ten forty-five and the display shows three thirty-five."

2. At any point in time, the student can go on to any of the other features of the product.

(a) He can press the LEVEL key 62. In this case, the unit speaks the level selected. For example "Level 1". If he presses the LEVEL key again, it rolls over to the next level. In this case, it will say "Level 2".

Once the student has chosen the level of difficulty, he can choose any of the activities. For example, he may choose the MATCH activity by pressing key 74. In this case, the unit speaks the activity chosen by the student followed by the level chosen, i.e., "MATCH, Level 2". After this announcement, the unit proceeds to present a question to the student. The question could be one of the questions stored in memory and given at random or the question can be configured by the unit based on the rules defined by the activity and stored in the algorithm/memory. For example, the unit can display a certain time, say 10:30 on the LCD 30 and ask the student to match it on the analog clock 16. The device 10 then gives a predetermined amount of time (say 30 seconds) to the student to input his response. The student sets the clock hands and enters his response with the CHECK key 64. The unit determines the correctness of the response and communicates it. If response is correct, it will speak a praise phrase such as "Great, That's Correct" and follow it with another question within that activity and level. If the response is incorrect, the unit communicates it with a statement like "That's not it, try again." If even after the second try the student inputs an incorrect answer, the unit responds with the correct answer. In this instance, the unit could say, "That's not it. That's five fifteen", then advance the clock hands to 6:30 and say, "This is six thirty".

If the student does not respond, or leaves the unit unattended, for two minutes, the unit returns to the correct time and powers down. The clock, however, continues to run and the LCD 30 shows the correct time of day. This flow diagram, in essence, applies to all other activities, in that the general methodology is common although the actual implementations are different.

In the mode of operation shown in the flow chart of FIG. 4B, the clock (digital or analog) functions under the power of the battery. A student presses a selected key. The device 10 speaks the correct time through the synthesizer driven by the microprocessor in a manner similar to the original product. The device 10 then automatically resets for receiving additional instructions from the student. (Returns to the clock sequence). The clock continues to keep time during the speaking cycle. There will also be an option of using an AC adapter operating through a rectifier to drive the clock(s).

Another derivative product or alternate mode of operation of the device 10 is shown in FIG. 4C. In this mode, there is a random selection of activities rather than selection by the student. Here, the student first presses the power-on key as shown at 90. The device then presents a question which can be randomly selected. The question is presented verbally and/or visually. The questions are stored in the memory of the microprocessor 40. The student then responds to the question by manipulating the analog clock hands and/or the digital display. The device checks for a correct response. If the answer is correct, there is feedback indicating a correct response and the questioning sequence is commenced again. If the response is incorrect, feedback to that effect is given and the device encourages the child to try again. After a selected number of tries, the correct response is given and the system returns to the question selection step 92.

One feature (optional) of the device 10 is to keep score. In this mode, the questions are counted and the correct number of responses is determined. The score is displayed by speaking and/or by the digital clock display 30. After the scoring process is completed, the child can either power-down the unit or commence another set of question selection operations.

From the foregoing detailed description, it will be recognized that an electronic learning device for teaching students and children how to tell time has been provided. The device is a dedicated learning aid, and incorporates various modes of operation. In one mode of operation depicted in flow chart 4B, the device serves as an audible clock for announcing time indicated on a suitable clock input. In another mode of operation, activities are selected by the device, and time-identification problems are presented to a student for response. In another mode of operation various activities and difficulty levels can be selected by the student. This includes analog and digital clock inputs, and provides comments on the student's response by use of a microprocessor driven speech synthesizer having operatively associated speech memory. Thus, the device is designed to maintain the interest of the student and to provide the student with game-like exercises which increase the pleasure of the learning experience.

While a preferred embodiment of an electronic learning device for teaching how to tell time has been shown and described, it will be understood that there is no intent to limit the invention to such a disclosure, but rather it is intended to cover all modifications and alternate constructions falling within the spirit and scope of the invention as defined in the appended claims.

We claim:
1. An electronic learning device comprising:
   student input means for generating a code representative of time;
   interrogation (visual and/or auditory) means responsive to said code generated by said student input means to request said student to engage in a selected time-identification problem;
   comparison means responsive to reading a specific code generated by said input means in response to said request to determine if said specific code corresponds to a correct student response to said time-identification problem; and
   a display means to effect said request and comment on the appropriateness of response by said student to time-identificatin problems.
2. The device of claim 1 wherein said means to effect said request comprises speech synthesis means.
3. The device of claim 2 including motor means for rotating hands of an analog clock to a selected location indicating an appropriate response to a time-identification problem.
4. The device of claim 1 wherein said means to effect said request comprises display means.
5. The device of claim 4 including means for scoring the responses of said student to requests generated by said interrogation means.
6. The device of claim 5 including a plurality of scoring means for recording scores accumulated by more than one player.
7. The device of claim 1 including motor means for rotating said hands of an analog clock to a selected location indicating an appropriate response to a time-identification problem.
8. An electronic learning device comprising:
   student input means having first input means for generating an input code representative of a selected activity and further input means which generates a code representative of time;
   interrogation means responsive to said code generated by said student input means to request said student to engage in a selected time-identification problem;
   comparison means responsive to reading a specific code generated by said further input means in response to said request to determine if said specific code corresponds to a correct student response to said time-identification problem; and
   a speech synthesis means to effect said request and comment on the appropriateness of responses by said student to time-identification problems.
9. An electronic learning device comprising:
   student input means having first input means for generating an input code representative of a selected activity and further input means comprising an analog clock having student operable hands mechanically connected to encoders which generate a code representative of the time identified by the position of said hands;
   interrogation means responsive to said code generated by said student input means to request said student to engage in a selected time-identification problem;

comparison means responsive to reading a specific code generated by said further input means in response to said request to determine if said specific code corresponds to a correct student response to said time-identification problem; and a speech synthesis means to effect said request and comment on the appropriateness of responses by said student to time-identification problems.

10. The device of claim 9 wherein said first input means includes means for generating an input code representative of a selected activity difficulty level.

11. The device of claim 9 wherein said further input means includes student operable keys in response to which a code is generated representative of time identified on a digital clock.

12. The device of claim 9 including motor means for rotating said hands of said clock to a selected location indicating an appropriate response to a time-identification problem.

* * * * *